UNITED STATES PATENT OFFICE 2,519,957

PREPARATION OF DIALKOXYALKANE-NITRILES

John G. Erickson, Greenwich, Conn., assignor to American Cyanamid Company, New York, N. Y., a corporation of Maine No Drawing. Application June 21, 1949, Serial No. 100,531

6 Claims. (Cl. 260—465.6)

The present invention relates to the preparation of alkoxy-nitriles, and more particularly to methods of producing dialkoxyalkane nitriles which conform to the general formula

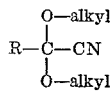

in which R represents a member of the group consisting of hydrogen, alkyl, and aryl radicals such as, for example, dimethoxyacetonitrile, diethoxyacetonitrile, di-n-butoxyacetonitrile, bis(2-ethylhexyloxy) - acetonitrile, α,α-dimethoxypropionitrile, α,α-diethoxybutyronitrile, α,α-diisopropoxyvaleronitrile, α,α-diethoxyphenylacetonitrile, α,α-di-n-propoxy-1-naphthylacetonitrile, and the like.

It has been discovered that a dialkoxyalkanenitrile of the above type may be readily prepared by reacting together hydrocyanic acid and an orthoester of the formula

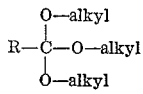

in which R has the meaning shown above.

A typical reaction in which methyl orthoacetate and hydrocyanic acid are reacted together to produce α,α-dimethoxypropionitrile may be illustrated as follows:

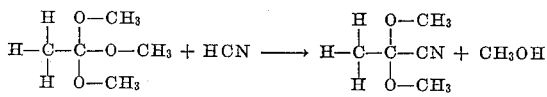

The reaction may be carried out at temperatures within the range of from about 20° C. to 200° C. The higher temperatures are usually preferred when operating without a catalyst, for example above 100° C. Lower temperatures, for example ordinary room temperature, are suitable when a catalyst is employed. Such catalytic materials include zinc chloride, aluminum chloride, magnesium chloride, antimony chloride, bismuth chloride, boron trifluoride, sulfuric acid, and p-toluenesulfonic acid.

Orthoesters of the type utilized in the present invention are well known compounds, and methods for preparing them are disclosed in the literature.

The invention is further illustrated by the following examples in which the parts are by weight.

Example 1

53 parts of methyl orthoformate and 20.2 parts of hydrocyanic acid were heated together in an autoclave for 3 hours at 150° C. Fractional distillation of the reaction product yielded 25.5 parts of dimethoxyacetonitrile, a colorless liquid, B. P. 139.5° C. (772 mm.), $n_D^{25}$ 1.3818, $d_4^{25}$ 0.9897.

Example 2

53 parts of methyl orthoformate and 20.2 parts of hydrocyanic acid were mixed together and allowed to stand in a closed vessel for 17 days at 25° C. Distillation yielded 3.3 parts of dimethoxyacetonitrile and 46 parts of unreacted methyl orthoformate.

Example 3

53 parts of methyl orthoformate and 20.2 parts of hydrocyanic acid were mixed together in a closed vessel. 0.3 part of boron trifluoride etherate (commercially available product obtained by the reaction of boron trifluoride with ethyl ether) was added to the mixture which was allowed to stand for 6 days at 25° C. The catalyst was then neutralized by the addition of ammonia and the mixture was distilled to yield 5.3 parts of dimethoxyacetonitrile and 38.3 parts of unreacted methyl orthoformate.

Example 4

0.3 part of magnesium chloride hexahydrate was added to a mixture consisting of 53 parts of methyl orthoformate and 20.2 parts of hydrocyanic acid. The mixture was allowed to stand for 7 days at 25° C. It was then distilled to yield 15 parts of dimethoxyacetonitrile and 29.6 parts of unreacted methyl orthoformate.

Example 5

A mixture consisting of 53 parts of methyl orthoformate, 20.2 parts of hydrocyanic acid and 0.2 part of zinc chloride was allowed to stand in a closed vessel for 6 days at 25° C. The reaction mixture was distilled to yield 24 parts of dimethoxyacetonitrile and 19 parts of unreacted methyl orthoformate.

Example 6

Example 5 was repeated with the exception that the reaction mixture was neutralized with a solution of potassium hydroxide in methanol before distillation. 44.8 parts of dimethoxyacetonitrile were obtained.

Example 7

20 parts of ethyl orthoformate was mixed with 14.6 parts of hydrocyanic acid. 0.2 part of concentrated sulfuric acid was added and the mixture was allowed to stand for 10 days at 25° C.

The catalyst was then neutralized by the addition of a slight excess of triethylamine and the mixture was distilled to yield 11.7 parts of diethoxyacetonitrile, a colorless liquid, B. P. 167.7° C. (773 mm.), $n_D^{25}$ 1.3937, $d_4^{25}$ 0.9288.

Example 8

A mixture consisting of 292 parts of ethyl orthoformate, 81 parts of hydrocyanic acid and 0.63 part of zinc chloride was allowed to stand for 3 days at 25° C. The catalyst was then neutralized with a solution of potassium hydroxide in ethanol. The mixture was distilled to yield 204 parts of diethoxyacetonitrile and 30.2 parts of unreacted ethyl orthoformate.

Example 9

292 parts of ethyl orthoformate and 81 parts of hydrocyanic acid were mixed together in a closed vessel. 0.88 part of p-toluenesulfonic acid monohydrate was added to the mixture which was allowed to stand at 25° C. for 2 days. The catalyst was neutralized with a solution of potassium hydroxide in ethanol. Distillation yielded 157 parts of diethoxyacetonitrile and 55 parts of unreacted ethyl orthoformate.

Example 10

A mixture consisting of 43.8 parts of ethyl orthoformate and 16.2 parts hydrocyanic acid was heated in an autoclave at 100° C. for 12 hours. Distillation of the reaction product gave 15.7 parts of diethoxyacetonitrile and 13.5 parts of unreacted ethyl orthoformate.

Example 11

A mixture consisting of 69.6 parts of butyl orthoformate, 12.2 parts of hydrocyanic acid and 0.14 part of zinc chloride was allowed to stand in a closed vessel for 7 days at 25° C. The catalyst was then neutralized with a solution of potassium hydroxide in ethanol. The mixture was distilled to yield 52.9 parts of dibutoxyacetonitrile, a colorless liquid, B. P. 231° C. (757 mm.), $n_D^{25}$ 1.4158, $d_4^{25}$ 0.8941.

Example 12

80 parts of 2-ethylhexyl orthoformate was mixed with 8.1 parts of hydrocyanic acid in a closed vessel. 0.1 part of zinc chloride was added to the mixture which was allowed to stand at 25° C. for 6 days. The catalyst was then neutralized with a solution of sodium hydroxide in methanol. The mixture was distilled under reduced pressure to yield 47.8 parts of bis(2-ethylhexyloxy)-acetonitrile, a colorless liquid, B. P. 125° C. (0.5 mm.), $n_D^{25}$ 1.4373, $d_4^{25}$ 0.8804.

Example 13

A mixture consisting of 60 parts of methyl orthoacetate, 20.2 parts of hydrocyanic acid and 0.3 part of p-toluenesulfonic acid was allowed to stand at 25° C. for 6 days. The catalyst was then neutralized with potassium hydroxide in ethanol, and the mixture was distilled to yield 50.1 parts of α,α-dimethoxypropionitrile, a colorless liquid, B. P. 85° C. (130 mm.), $n_D^{25}$ 1.3877, $d_4^{25}$ 0.9604.

Example 14

A mixture consisting of 120 parts of methyl orthoacetate, 40.5 parts of hydrocyanic acid and 0.27 part of zinc chloride was allowed to stand for 11 days at 25° C. The catalyst was then neutralized with potassium hydroxide in ethanol, and the mixture was distilled to yield 102.8 parts of α,α-dimethoxypropionitrile.

Example 15

44.8 parts of ethyl orthobenzoate and 10.8 parts of hydrocyanic acid were mixed together. 0.14 part of zinc chloride was added to the mixture which was allowed to stand at 25° C. for 24 days. The catalyst was then neutralized with a solution of potassium hydroxide in ethanol, and the mixture was distilled to yield 18.5 parts of α,α-diethoxyphenylacetonitrile, a colorless liquid, B. P. 102.5° C. (3.5 mm.), $n_D^{25}$ 1.4794, $d_4^{25}$ 1.0112.

Any unreacted orthoester which is recovered, for example by fractional distillation of the reaction product, may be recycled in the process.

The dialkoxyalkanenitriles, prepared by the methods of the present invention, are adapted for various uses, more particularly as intermediates in the production of chemotherapeutic agents, pharmaceuticals, resins, and plastics.

While the invention has been described with particular reference to specific embodiments, it is to be understood that it is not to be limited thereto but is to be construed broadly and restricted solely by the scope of the appended claims.

I claim:

1. A method of preparing an alkoxyalkanenitrile of the general formula

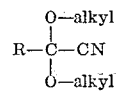

wherein R is a member of the group consisting of hydrogen, alkyl, and aryl radicals which includes the step of reacting together hydrocyanic acid and an orthoester of the formula

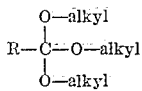

in which R has the meaning designated above.

2. The method of claim 1 in which the reaction is carried out at a temperature within the range of from about 20° C. to 200° C.

3. The method of claim 1 in which the reaction is carried out in the presence of a catalyst.

4. A method of preparing dimethoxyacetonitrile which includes the step of reacting together hydrocyanic acid and methyl orthoformate in the presence of zinc chloride.

5. A method of preparing diethoxyacetonitrile which includes the step of reacting together hydrocyanic acid and ethyl orthoformate in the presence of sulfuric acid.

6. A method of preparing α,α-dimethoxypropionitrile which includes the step of reacting together hydrocyanic acid and methyl orthoacetate in the presence of p-toluenesulfonic acid.

JOHN G. ERICKSON.

No references cited.